United States Patent
Nemazi et al.

(10) Patent No.: US 8,117,790 B2
(45) Date of Patent: Feb. 21, 2012

(54) OVERMOLDED FENESTRATION BUILDING PRODUCT AND METHOD OF MANUFACTURE

(75) Inventors: John E. Nemazi, Bloomfield Hills, MI (US); G. Daniel Templeton, Ft. Wayne, IN (US)

(73) Assignee: VTech Patents LLC, Houston, TX (US)

( * ) Notice: Subject to any disclaimer, the term of this patent is extended or adjusted under 35 U.S.C. 154(b) by 604 days.

(21) Appl. No.: 11/671,726

(22) Filed: Feb. 6, 2007

(65) Prior Publication Data

US 2008/0184635 A1    Aug. 7, 2008

(51) Int. Cl.
*E06B 1/04* (2006.01)

(52) U.S. Cl. .............. 52/213; 52/80.1; 52/211; 52/58

(58) Field of Classification Search .......... 52/90.1, 52/202, 208, 209, 211, 213, 200, 18, 58, 52/198, 220.8, 72, 80.1, 204.593
See application file for complete search history.

(56) References Cited

U.S. PATENT DOCUMENTS

| | | | | | |
|---|---|---|---|---|---|
| 3,434,251 | A | * | 3/1969 | Kiekhaefer | 52/22 |
| 3,630,814 | A | * | 12/1971 | Arnold | 428/34 |
| 3,861,444 | A | * | 1/1975 | Portwood | 160/90 |
| 4,333,295 | A | | 6/1982 | Janke | |
| 4,750,302 | A | | 6/1988 | Bechtold | |
| 4,782,630 | A | * | 11/1988 | Kleyn | 49/505 |
| 4,984,402 | A | * | 1/1991 | Davies | 52/204.593 |
| 4,998,392 | A | * | 3/1991 | Massarelli et al. | 52/208 |
| 5,148,643 | A | * | 9/1992 | Sampson et al. | 52/200 |
| 5,207,036 | A | * | 5/1993 | Sampson et al. | 52/72 |
| 5,765,325 | A | * | 6/1998 | DeBlock | 52/204.5 |
| 5,878,539 | A | | 3/1999 | Grubb | |
| 6,055,782 | A | * | 5/2000 | Morton et al. | 52/204.1 |
| 6,086,695 | A | * | 7/2000 | Kreye | 156/108 |
| 6,807,778 | B2 | * | 10/2004 | Engebretson | 52/204.59 |
| 6,904,727 | B2 | * | 6/2005 | Edger | 52/215 |
| 7,024,830 | B2 | * | 4/2006 | Schiedegger et al. | 52/204.61 |
| 7,490,445 | B2 | * | 2/2009 | Steffek et al. | 52/456 |
| 2004/0211134 | A1 | * | 10/2004 | Glover et al. | 52/204.5 |
| 2005/0055901 | A1 | | 3/2005 | Valentz et al. | |

* cited by examiner

*Primary Examiner* — Brian Glessner
*Assistant Examiner* — Adam Barlow
(74) *Attorney, Agent, or Firm* — Brooks Kushman P.C.

(57) ABSTRACT

An overmolded building product having a frame and a thin shell base. The frame has a periphery and a first aperture. The frame further has an overmolding adapted to receive a pane, which has an interior side and exterior side in contact with the overmolding. The pane covers the first aperture and transmits light. The thin shell base has an exterior side opposed to a portion of an interior side forming a first cavity. The first cavity selectably receiving a filler. The thin shell has a first distal end of the exterior side which may be selectably positionable adjacent to and securable to a roof member. The roof member defines a second aperture leading to a room in a building. The interior side of the thin shell defines a second cavity adjacent to the pane. The frame is securable to the thin shell base. The frame and thin shell base are molded using a process selected from thermoforming, rotomolding, compression molding, or injection molding.

19 Claims, 7 Drawing Sheets

US 8,117,790 B2

OVERMOLDED FENESTRATION BUILDING PRODUCT AND METHOD OF MANUFACTURE

BACKGROUND OF THE INVENTION

1. Field of the Invention

The present invention relates to an overmolded fenestration building product and its method of manufacture.

2. Background Art

Fenestration building products have been used to allow light into residential, commercial and industrial buildings. The fenestration buildings products typically fit in an opening in the building. Non-limiting examples include windows, doors, doorlites, sidelights, skylights and tubular skylights. The fenestration products will ideally allow light into the building while keeping other environmental elements out. However since the installation of the fenestration building products involves providing an opening in the building, sealing such units has presented a number of challenges.

In a typical fenestration building product installation, the opening is flashed with a sheet or part of a sheet to provide a leaktight seal between the fenestration product's frame and the wall section or door to which it is attached. Many of these fenestration products are fabricated during the installation of the fenestration product. Leaktight seals applied during field installation, which may have initially been effective, often degrade over time and begin to allow leaks of air and water. Minimizing the degradation of the seals or eliminating the sealing points all together, may improve the reliability of fenestration building products in terms of preventing air and moisture leakage.

The use of plastics to consolidate parts in an assembly is well known. Many of the joints which comprise a significant number of sealing points in certain fenestration building products can be eliminated by use of single-piece molded plastics. In general many objects can be overmolded by injecting plastic on to at least part of the edge of the object when it has been pressed between two platens of a mold. Experience has shown though that the use of this technique although satisfactory for many products, such as electrical equipment, poses a number of problems when applied to fragile materials, such as glass and thin sheets of relatively brittle plastic.

Overmolding of glass for a skylight has been disclosed in U.S. Patent Application 2005/0055901 filed by certain inventors of this application. The '901 application discloses a skylight frame molded about an insulated glass unit. The skylight frame assembly includes a frame section which has U-shaped channel molded by reaction injection molding (RIM). The U-shaped channel is adapted to hold one or more panels of glass. The skylight frame is then attached to a curb made by the (RIM) process using very expensive thermoset polyurethane material. The connection of the frame assembly and the curb provides a pathway for wind and water penetration if the seal is not effective.

The skylight of the '901 application does not fully transmit the light because the RIM material absorbs a significant amount of the light due to its relatively low surface reflectivity. This is particularly a problem when dealing with a tubular skylight where the light must travel at least one or more floors to reach the intended room.

What is needed is a building fenestration product that is suitable for all residential, commercial, and industrial uses and which minimizes the pathways that water can enter the building through the openings and which is economical to manufacture. It must also assist in transferring the light efficiently to the interior rooms and in particular in the rooms that are not adjacent to exterior walls or roofs.

SUMMARY OF THE INVENTION

The thin shell base has an exterior side opposed to a portion of an interior side forming a first cavity. The first cavity selectably receiving a filler. The thin shell has a first distal end of the exterior side which may be selectably positionable adjacent to and securable to a roof member. The roof member defines a second aperture leading to a room in a building.

The interior side of the thin shell defines a second cavity adjacent to the pane. The frame is securable to the thin shell base. The frame and thin shell base are molded using a process selected from thermoforming, rotomolding, compression molding, or injection molding.

DETAILED DESCRIPTION OF THE PREFERRED EMBODIMENT(S)

Figure 1:
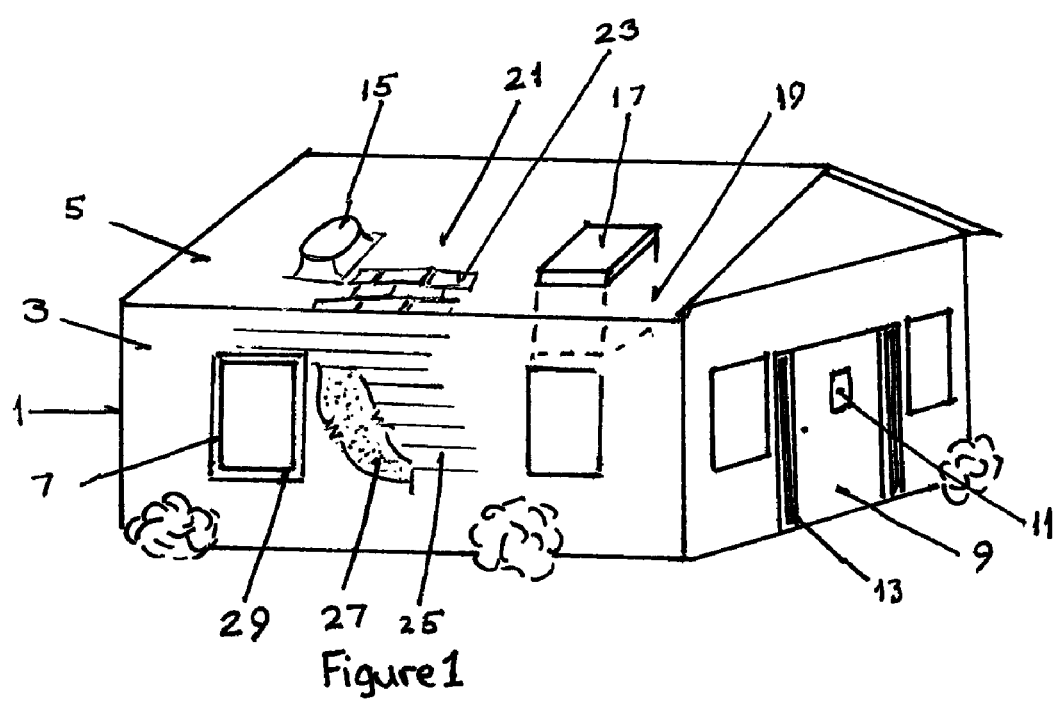
FIG. 1 is a perspective view of a house having fenestration building products according to embodiments of the present invention.

Reference will now be made in detail to embodiments of the present invention according compositions and methods which constitute the best modes of practicing the invention presently known to the inventors. With reference to FIG. 1, a perspective view of a house 1 is illustrated. The house 1 includes a vertical wall 3 and a non-vertical wall 5. Non-limiting examples of fenestration building products on the house 1 typically on the vertical wall 3 may include a window 7, a door 9, a doorlite 11, and a sidelight 13. On the non-vertical wall 5, non-limiting examples of fenestration building products may include a skylight 15 and a tubular skylight 17. The phantom lines indicate a light pipe 19 extending from the roof 21 to an interior room not immediately adjacent to the roof 21. The flashing for the fenestration building products is covered over by shingles 23, a siding 25, and/or a housewrap 27. The sash 29 of the window 7 may be all that is visible on the exterior of the building adjacent to the siding 25.

Figures 2A, 2B, 2C:
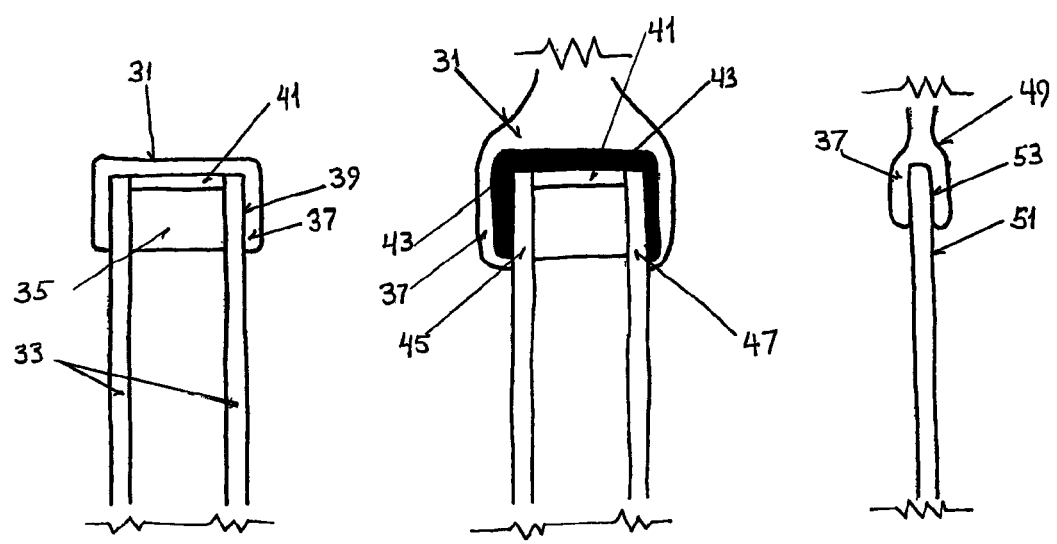
FIGS. 2a-e are fragmentary cross-sectional views of non-limiting examples of overmolded fenestration units according to certain embodiments of the present invention.

FIGS. 2a-e are fragmentary cross-sectional views of certain overmolded fenestration unit embodiments of the present invention. FIG. 2a illustrates a non-limiting example of an overmolded insulated unit 31 having opposed panes 33 separated by a spacer 35. The panes 33 and spacer 35 are overmolded by an overmolding 37. A pane-overmolding interface 39 has the pane 33 immediately adjacent to the overmolding 37. The pane-overmolding interface 39 may be understood to have the pane 33 activated by a chemical or a physical means to improve adhesion of the overmolding 37 to the pane 33. While the overmolding 37 may function as a sealant preventing moisture vapor achieving access to the interior of the insulated unit 31, it should be understood that the insulated unit 31 may additionally have an insulated unit seal 41 non-limiting examples of which may include butyl rubber, silicone, polyurethane, or polysulfide materials, typically found in the insulated unit industry. The pane 33 may be made of a light-transmitting material. Non-limiting examples of the light-transmitting material include acrylic family plastics, glass, polycarbonate family plastics, and combinations thereof. FIG. 2b illustrates another embodiment of the present invention where gasket 43 protects the edges of the insulated unit 31 from thermal and mechanical stresses accompanying the overmolding process. The gasket 43 may also provide additional sealing capabilities for the fenestration building product. The gasket 43 is adjacent to an interior side 45 of the insulated unit 31, the insulated unit seal 41, and an exterior side 47 of the insulated unit 31. The gasket 43 may be formed of many materials known in the art. Non-limiting examples of the materials include relatively high melt temperature thermoplastics; thermoset polymers such as epoxy, nitrile rubber or EPDM; metal foil such as aluminum; or combinations of the above. In the embodiment illustrated in FIG. 2b, the overmolding 37 entirely encapsulates the gasket 43.

FIG. 2c illustrates an embodiment of an overmolded single pane unit 49 having a plastic pane 51. It should be understood that a single pane unit may also be employ the gasket. The overmolding 37 is connected to the plastic pane 51 to form a watertight seal. It should be understood that at an interface 53 primers and other adjuvants or mechanical, plasma, flame, and electrical surface treatments may be used to improve the adhesion of the overmolding 37 to the plastic pane 51 without violating the intent of this embodiment.

The plastic pane 51 may be formed by methods known in the art. The plastic pane 51 may include additional coextruded layers or applied coatings to augment features and enhance benefits without violating the intent of certain embodiments. Non-limiting examples may include an ultraviolet light resistant layer, a decorative film, an absorptive layer, light wavelength bandpass filter, or a tint.

Figures 2D, 2E:
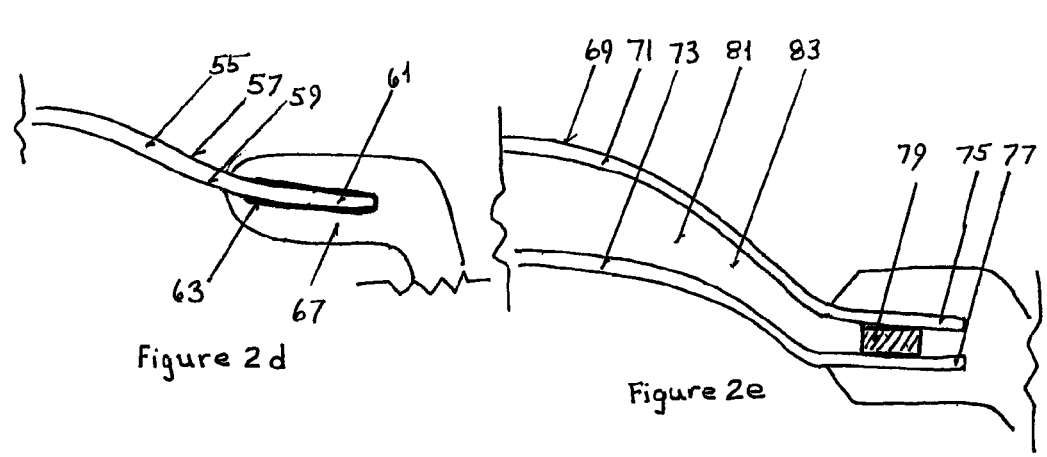

Referring to FIG. 2d, the plastic pane 55 is a single-paned skylight plastic dome according to an embodiment of this invention. The single-paned skylight dome has a top side 57, a bottom side 59, and is shaped so as to have a land 61 in an encapsulation zone 63.

An overmolding 67 adapted to receive the plastic pane 55 and two-sided tape 65 contacts the pane 55 in the encapsulation zone 63 and encapsulates a portion of the encapsulation zone 63 including all of the two-sided tape 65 positioned on the top side 57 of the pane 55.

Referring to FIG. 2e, the insulated unit 69 is an insulated skylight plastic dome according to an embodiment of this invention. The insulated skylight plastic dome has two plastic panes 71 and 73 each having peripheral edges 75 and 77. The peripheral edges are bonded together by an elongated two-sided plastic taped seal 79, which is interposed between the peripheral edges 75 and 77 to form a seal enclosing a central region 81. A non-limiting example of two-sided tape 79 is described in co-pending U.S. patent application Ser. No. 11/671,657 filed on Feb. 6, 2007 which is commonly owned and, which is incorporated in its entirety by reference. It should be understood that other two-sided adhesive products may be used and not depart from the spirit of this embodiment of the invention. The central region is provided with air or another suitable gas 83 to provide a relatively increased thermal barrier when the skylight is installed on the roof of the building. Non-limiting examples of the gas may include group eight gases such as argon, krypton, and xenon, or glass with a molecular weight in excess of 27 or having a molecular cross-sectional area greater than carbon dioxide.

Figure 3:
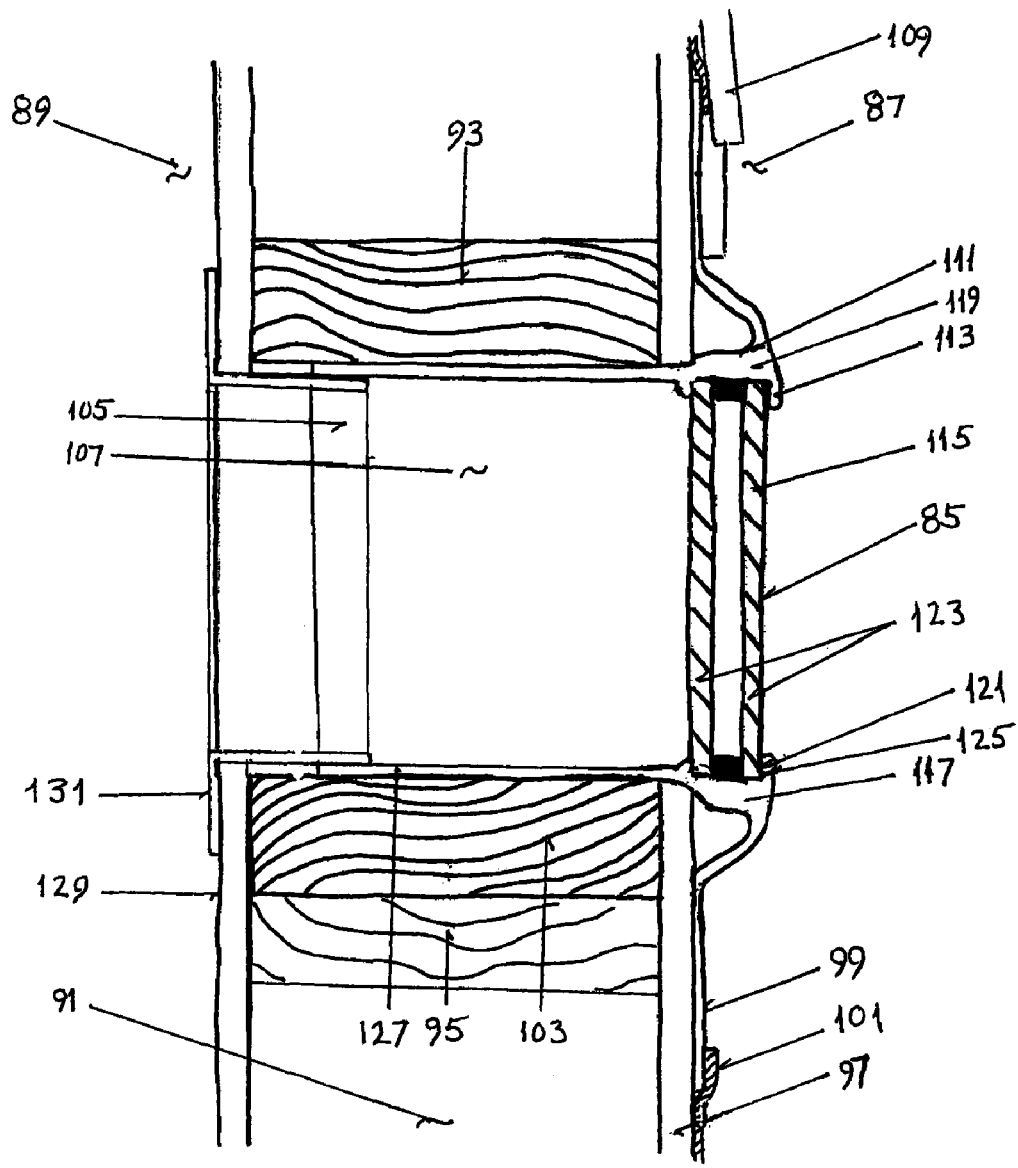
FIG. 3 is a fragmentary cross-sectional view of a window according to an embodiment of the present invention.

FIG. 3 is a fragmentary cross-sectional view of a window 85 according to an embodiment of the present invention. The window 85 has an exterior 87 and an interior 89. The window 85 is fitted on to a vertical wall 91. The wall 91 includes a framing header 93 and a base buck 95. Adjacent to the exterior wall 97 is a flashing 99 for the window 85. The flashing 99 is secured to the exterior wall 97 by means known in the art such as nails, staples, screws, or construction adhesive. A house wrap (not shown) and/or a flashing tape 101 are applied over the flashing 99 at a sill 103, which sits adjacent to the buck 95, opposed sides 105 and 107 of the window 85, and the header 93. A siding 109 is placed adjacent to a frame 111 of the window. The frame 111 includes the overmolding 113 and encapsulates the insulated unit 115. The frame 111, as illustrated in the non-limiting example of the FIG. 3 embodiment, includes two sets of opposed sides 117 and 119 of a rectangle forming an aperture. It should be understood that any geometric shape may be used and not depart from the spirt of this embodiment of the invention. The opposed sides 117 and 119 include a channel 121 approximately parallel to the wall 94, and suitable for supporting one or more window panes 123. The channel is formed during overmolding of the window panes 123. The channel 121 is adjacent to an overmolded land area 125. It should be understood that the land area 125 may also include a gasket and other sealants. The frame 111 further includes a sill flashing 127 extending from the interior side of the window pane 123 toward an interior wall 129. The sill flashing 127 may be secured to the buck 95, the sides 105 and 107, and the header 93 of the wall 94 using methods known in the art such as nails, staples, screws or construction adhesive. An interior trim piece 131 may be an L-shaped component that may be attached to the interior wall 129 and cover a portion of the sill flashing 127.

Figure 4A:
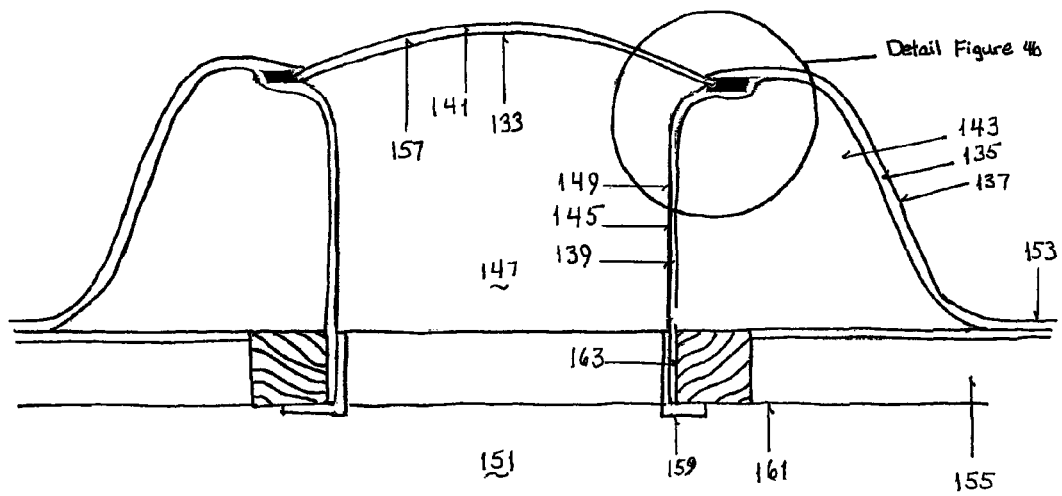
FIG. 4a is a fragmentary cross-sectional view of skylight according to an embodiment of the present invention.
Figure 4B:
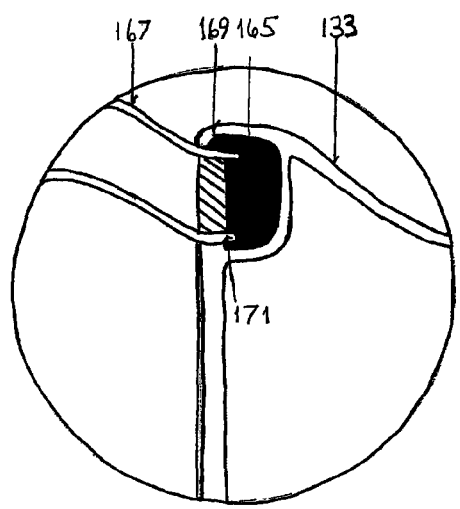
FIGS. 4b and 4c are fragmentary cross-sectional detail views of overmoldings according to certain embodiments of the present invention.
Figure 4C:
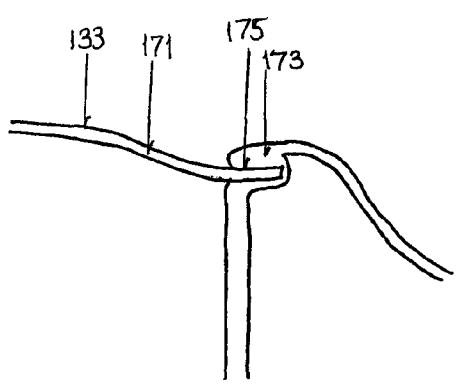

FIGS. 4a-c are fragmentary cross-sectional views of a skylight 133 according to certain embodiments of this invention. The skylight 133 includes a thin shell frame 135. The thin shell frame includes an exterior side 137 and an interior side 139, a light-transmitting pane 141, and a filled cavity 143. The interior side 139 may include an inside wall 145 which defines a light cavity 147. The light cavity 147 may have an optional reflective surface 149 in order to improve the transmission of sunlight to the interior room 151 below. The exterior side 137 has a skylight flashing 153 located at the distal end of the thin shell frame 135 and adjacent to a roof member 155 in a non-vertical orientation. The skylight flashing 153 may be secured to the roof member 155 by conventional means, such as nails, staples, screws, or construction adhesive. The light-transmitting pane 141 may include a domed pane 157. It should be understood that a planar pane or a pane having other non-planar configurations would not depart from the spirit of this embodiment of the invention. The pane 157 may comprise an upper end of the light cavity 147. A lower end of the light cavity 147 may be defined by a telescoping L-shaped trim section 159. The telescoping trim section 159 may extend from a room ceiling 161 of the room 151 below the skylight 133 and cover the interior side 139 of the thin shell frame 135. The telescoping trim section 159 and an interior flashing 163 which is an integral part of the thin shell frame 135 located at the proximal end of the thin shell frame 135, may be trimmed with interior molding or may reduce construction costs by integrating the trimming function into the skylight 133 design.

FIG. 4b is an illustration of another embodiment of the skylight 133 in which a non-limiting example of a skylight insulating unit having a skylight sealing gasket 165 is illustrated. The sealing gasket 165 covers the vulnerable edge of an insulated light-transmitting pane 167. The sealing gasket 165 also provides weathertightness for the skylight 133. A skylight insulated unit overmolding 169 entirely encapsulates the sealing gasket 165 and is adjacent to the light-transmitting pane 167 at a portion of an encapsulation zone 171. It should be understood that the overmolding 169 may incorporate a portion of the sealing gasket 165 or the insulating unit 163. It is not a requirement that the overmolding 169 be a continuous layer of plastic. It should be understood that the overmolding 169 may be discontinuous. Non-limiting examples of structures that may make the overmolding 169 discontinuous include a portion of the gasket, an insert, a tail of a polyvinylbutylene layer when a laminated glass is used in the pane 167, or an incomplete molding.

FIG. 4c is a fragmentary cross-sectional view of the skylight 133 having a single acrylic pane 171 in a skylight light-transmitting pane. In this non-limiting embodiment, the overmolding 173 is adjacent to the acrylic pane 171 in an encapsulation zone 175. It should be understood that the acrylic pane 171 may also include adhesion promoting means to improve the adhesion of the overmolding 169 in the encapsulation zone 175. It should be understood that the overmolding 169 may be discontinuous particularly when surrounding the periphery of the pane 173. It should be further understood that the pane may include optional coatings and/or surface treatments. A non-limiting example may be a ceramic frit for aesthetic purposes.

Figure 5A:
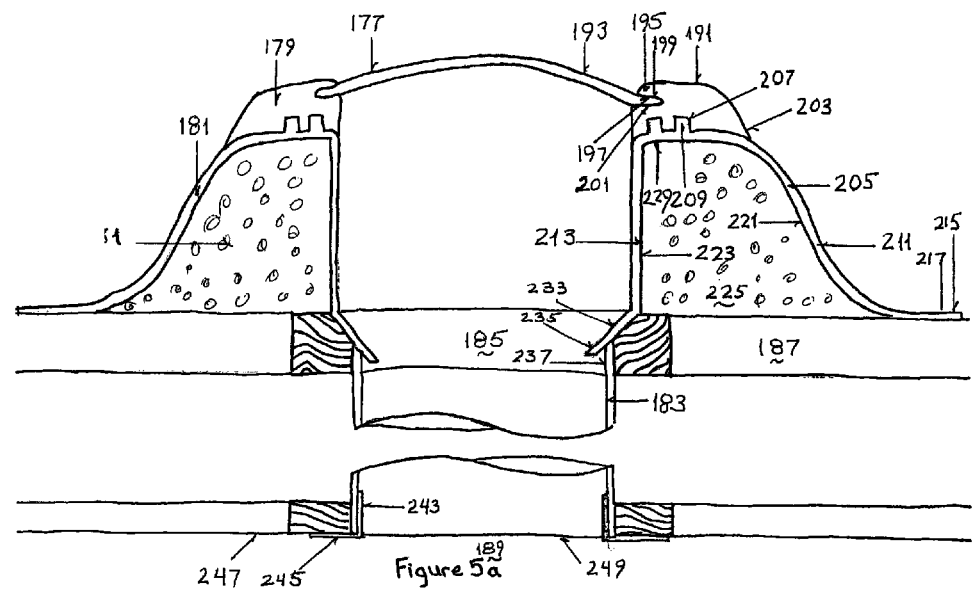
FIGS. 5a-b are fragmentary cross-sectional views of tubular skylights according to certain embodiments of the present invention illustrating a light pipe sealing flange cooperating with a light pipe.
Figure 5B:
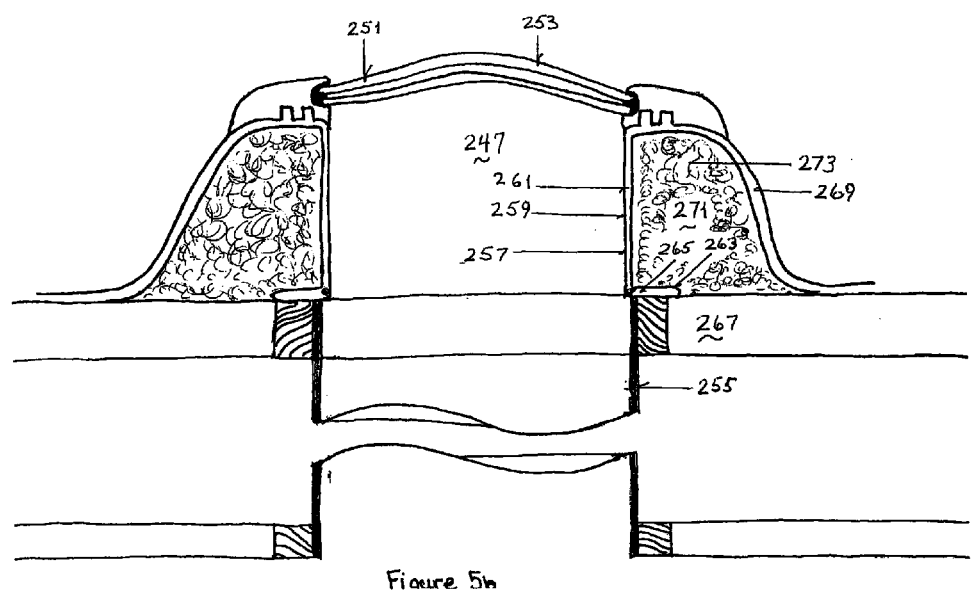

FIGS. 5a-b illustrate embodiments of a tubular skylight 177. Referring to FIG. 5a, the tubular skylight 177 includes three components: a cap assembly 179, a thin shell base 181 and a light pipe 183, which extends through an aperture 185 in a roof member 187 and leads to an interior room 189, which the ceiling of which is located a relatively long distance from the roof member 187. The cap assembly 179 includes a frame 191 housing the light-transmitting pane 193. The light-transmitting pane 193 is secured to the frame 191 by a tubular skylight overmolding 195 which forms a channel 197 that entirely encapsulates a top side 199 of the light-transmitting pane 193, as well as a bottom side 201 of the light-transmitting pane 193. The cap assembly 179 further includes a downstanding flange 203 that provides extra coverage and weatherproofing for the protection of an interface when the cap assembly 179 is connected to a thin shell base 205. The weathertight seal between the cap assembly 179 and the thin shell base 205 is enhanced with an optional sealing notch 207 in the cap assembly 179. The sealing notch 207 is positioned to cooperate with an upstanding rib 209 located on the thin shell base 205. The joint between the cap assembly 179 and the thin shell base 205 may optionally be sealed, in addition, with conventional material such as fasteners, caulking, foam tape, or construction adhesives. It should be understood that other cooperating features would not depart from the spirit of this embodiment of the invention. Non-limiting examples of cooperating features besides the notch 207 and the upstanding rib 209 include a tongue-and-groove configuration, an inclined plane, embedded magnets, or a weep channel. It should be understood that the thin shell base 205 may include bases comprised of a skin layer and a bulk layer without departing from the spirit of the embodiment. The bulk layer may, as non-limiting example, comprise a reduced density layer. A non-limiting example of the reduced density layer may be foamed thermoplastic. The bulk layer may also, as a non-limiting example, comprise a filled thermoplastic, an example of which is calcium carbonate filled polystrene.

The thin shell base 205 includes an exterior side 211 and an interior side 213. A distal end 215 of the exterior side 211 forms a securing flange 217 which may be secured to the roof member 187 by means well known in the art. The exterior side 211 has an inside face 221. An inside face 223 of the interior wall of the thin shell 213 is positioned approximately opposite the inside face 221 of the exterior thin shell wall. Together they form a cavity 225. The cavity 225 has an upper end at least partially formed by the inside face 221 at a proximal end 229 of the thin shell exterior wall 211. The cavity 225 may optionally be filled with a material 231 to provide insulation, structural strength, or a combination thereof. Non-limiting examples of the material 231 include inexpensive fillers, especially inexpensive fillers that reduce relative thermal conductivity, such as packaging foam, adhered reflective glass spheres, and/or relatively low density polyurethane foam. It is advantageous if the material 231 additionally increases structural strength.

The interior wall 213 of the thin shell base 181 includes a sealing flange 233 at a distal end 235 which optionally may cooperate with an upper end 237 of the light pipe 183. The light pipe 183 may extend to the interior room 189 located a relatively long distance from the roof member 187. The light pipe 183 allows some light to be directed to the interior room 189 which would otherwise not have exposure to sunlight. The light pipe 183 may be trimmed out with an L-shaped trim section 243, which has a flange 245 that may be secured to a ceiling 247 of the interior room 189. An optional diffuser 249 may be applied to the light pipe 183 to enhance the dispersion of the sunlight.

The thin shell base 215 is relatively easily shaped in a relatively few number of processing steps. Non-limiting examples of materials for the thin shell base may include polyolefins, polyvinyl chloride, polyalkyl terephthalates, liquid silicone rubber, bulk molding compound, polystyrene, and reinforced plastics. These materials may be shaped by open and close mold methods. Non-limiting examples of methods may include thermoforming, injection molding, rotomolding, and compression molding.

FIG. 5b illustrates a fragmentary cross-sectional view of a tubular skylight 251 having an insulated unit 253. In this non-limiting example, the diameter of a light pipe 255 exceeds the diameter of a light cavity 257 defined by an interior wall 259 of a thin shell base 261. A distal end 263 of the interior wall 259 includes a light pipe sealing flange 265. The light pipe sealing flange 265 cooperates with the light pipe 255 and lies adjacent to a roof member 267. The thin shell base 261 includes the interior wall 259 and an exterior wall 269. The exterior wall 269 is opposed to the interior wall 259 and defines a filler cavity 271. The filler cavity 271 is filled with a compliant filler 273 such as a polyurethane foam. The compliant filler 273 allows the light pipe sealing flange 265 to embed itself into the filler 273 allowing the tubular skylight 251 to remain approximately flush with the roof member 267. This may assist in assuring weathertightness. It should be understood that the filler 273 may comprise more than one layer. A non-limiting example may include a polyrethane foam layer capped by a putty layer which is covered by a peel-off layer to protect the compliant putty layer from dirt and debris during installation.

The interior wall 259 of the thin shell base 261 defines the light cavity 257. In certain embodiments, to enhance the ability of the light cavity 257 to transmit sunlight to the room below, the light cavity 257 includes a reflective coating 275. It should be understood that the reflective coating 275 may also be optionally applied to the light pipe sealing flange 265 and the light pipe 235.

Figure 6A:
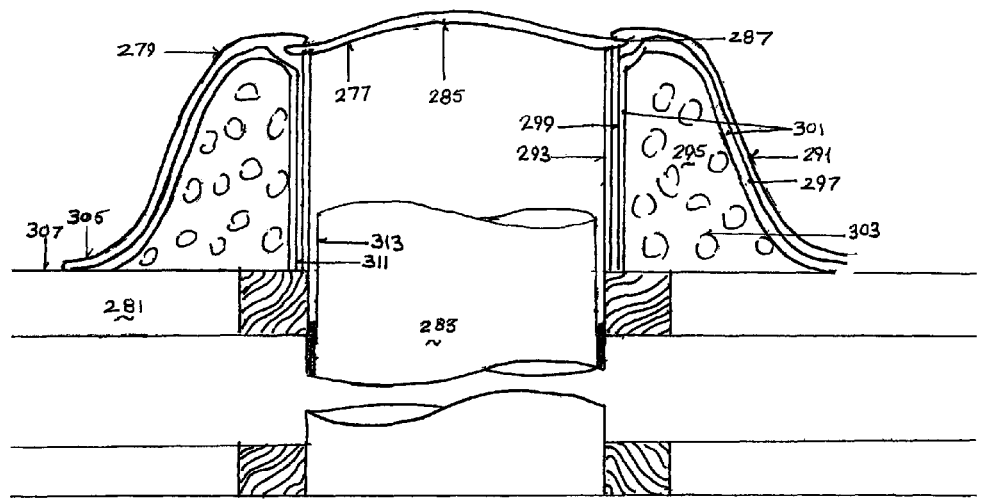
FIGS. 6a-b are fragmentary cross-sectional views of a unitized tubular skylight according to embodiments of the present invention illustrating overmolded light-transmitting units and non-limiting examples of cooperation with a light pipe.
Figure 6B:
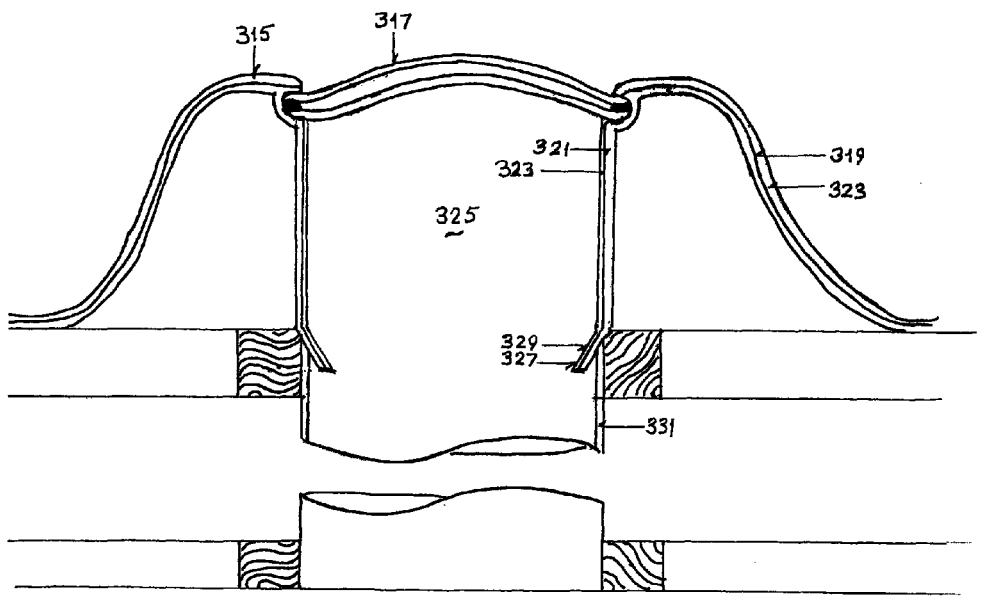

FIGS. 6a-b illustrate fragmentary cross-sectional views of the tubular skylight 277 according to embodiments of this invention. FIG. 6a illustrates a single-paned unitized tubular skylight top 279. The top 279 may be positioned on a roof member 281 having an aperture 283. The unitized tubular skylight top 279 includes an encapsulated light-transmitting pane 285 which is encapsulated in a channel 287 formed during the molding process of the unitized top 279. The unitized top 279 has an exterior side 291 and an interior side 293, where the exterior side is approximately opposed to the interior side 291 and forms a filler cavity 295. The inside face 297 of the exterior side and the interior face 299 of the interior side may be coated with a thermally reflective coating 301, of which aluminum paint is a non-limiting example. The filler cavity 295 may then be filled with a filler 303 that reduces the thermal conductivity and/or increases the structural rigidity of the unitized tubular skylight top 279, of which expanded polystyrene foam is a non-limiting example.

Referring to FIG. 6a, the distal end 305 of the single-paned unitized tubular skylight top 277 may be secured to a top side 307 of the roof member 281, while the distal end 311 of the interior side 293 may cooperate with a light pipe 313. The light pipe 313 may be below, even with, or extend above (as shown) the top side 307.

FIG. 6b illustrates an insulated pane unitized tubular skylight top 315 having an insulated unit 317. The unitized tubular skylight top 315 has an exterior side 319 and an interior side 321. The exterior side 319 may further have a capstock 323 which may optionally be continued to the interior side 321. The capstock 323 may provide protection from ultraviolet degradation as well as provide a relatively reflective surface for both the exterior and a light cavity 325 defined by the interior side walls 321. A non-limiting example of the capstock 323 material may include vapor-deposited metal film. A distal end 327 of the interior side 321 may include a light pipe seal flange 329. The light pipe seal flange 329 assists to seal a light pipe 331 to the light cavity 325 to avoid loss of light being reflected from the light cavity 325, as well as prevent debris from entering the light pipe 331.

Figure 7:
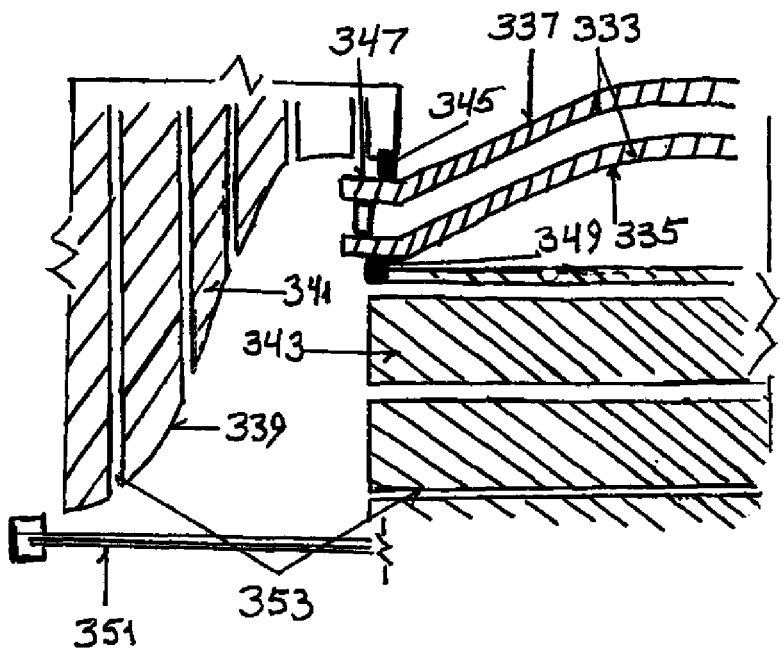
FIG. 7 is a fragmentary cross-sectional view of a non-limiting example of an open mold for thermoforming an overmolded fenestration building unit according to certain embodiments of the present invention.

FIG. 7 illustrates one embodiment of a method for making the fenestration building product such as the window 3, the skylight 5 and the tubular skylight 7 according to certain embodiments of this invention. The method involves providing a light-transmitting pane 333 such as the pane 33 (FIG. 2a), the insulated unit 115 (FIG. 3), and the insulated unit 253 (FIG. 5b). The light-transmitting pane 333 has a interior side 335 and an exterior side 337. The light-transmitting pane 333 has a length and a width according to the design of the fenestration building product.

An open mold 339 has a cavity side 341 and a core side 343. The cavity side has a conformable seal 345. The conformable seal 345 contacts the exterior side 337 of the light-transmitting pane 333. This conformable seal 345 provides a barrier to a dispersion of a molten plastic from an encapsulation land 347 such as illustrated in the encapsulation zone 171 (FIG. 4b). This provides an aesthetically pleasing finish to the plastic making it appear like a snapped-on bezel. The core side has another conformable seal 349 contacting the interior side 335 of the light-transmitting pane 333. These conformable seals 345 and 349 may be selectively positioned and generally are approximately opposed on the interior side 335 and the exterior side 337 of the light-transmitting pane 333. An inside dimension of the seals relative to a length and width of the light-transmitting pane 333 is less than the respective length and width of the light-transmitting panel 333. The encapsulation land 347 may include the annulus resulting from overlaying the conformable seals 345 and 349 on the light-transmitting panel 333.

Referring to FIG. 7, a shaping method for forming the fenestration building product may also use a sheet of plastic 351 and the open mold 339. The sheet of plastic 351 may be the single thermoplastic or a composite material including the thermoplastic. A non-limiting example of such a composite thermoplastic includes a plastic with a capstock that is resistant to ultraviolet light. A non-limiting example of such a capstock is an acrylate-styrene-acrylonitrile (ASA) layer which is co-extruded on the thermoplastic, a non-limiting example being polyvinyl chloride (PVC). Additional layers may be co-extruded or applied to a sheet such as a physical vapor deposited metal film or a spray paint. It may be advantageous to have a metal film on the exterior side of the products because the metal could assist in forming the reflective cavity such as reflective cavity 149 (FIG. 4a). The metal film would also provide good ultraviolet light protection to the exterior side 137 (FIG. 4a).

In forming an overmolded window for a fenestration building product as illustrated in FIG. 3 using an open mold method, non-limiting examples of typical methods would include various thermoforming methods. Non-limiting examples of thermoforming methods include free forming, plug-assist forming, drape forming, match mold forming, slip forming, snap-back forming, simultaneous twin sheet pressure forming, encapsulation thermoforming, and combinations thereof.

Of particular concern in the open mold process is developing sufficient pressure differential to get the molded plastic to go around the edge of the light-transmitting layer to form an overmolded edge. Further, the overmolded edge must adhere to the light-transmitting layer without causing distortion or breakage of the light-transmitting layer. Non-limiting examples of such techniques are known in the art and may include practical placement of a vent opening 353 to draw the plastic 351 into the encapsulation area, the use of surge tanks to provide extra pressure differential relative to that which can be developed simply by a vacuum pump, the use of differential cooling to cause the plastic to snap back into overmolded areas, and/or combinations thereof.

Figure 8:
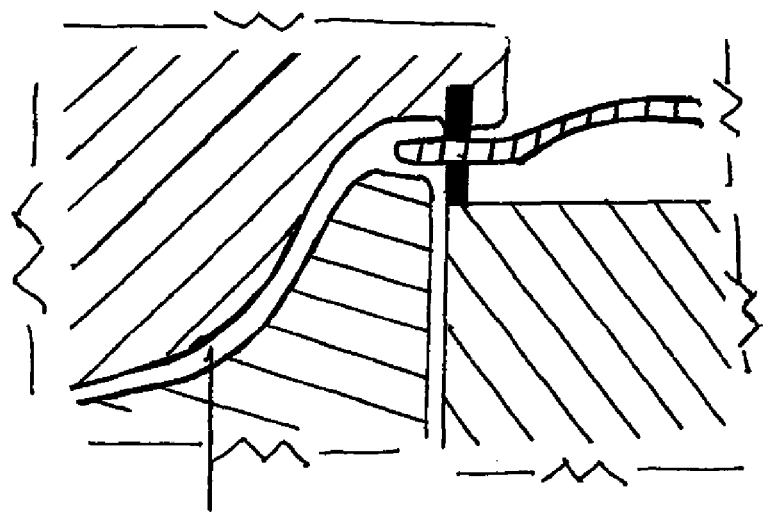
FIG. 8 is a fragmentary cross sectional view of a non-limiting example of a closed mold for shaping molten plastic into an overmolded fenestration building unit according to certain embodiments of the present invention.

Referring to FIG. 8, if closed mold methods are used, non-limiting examples of which are reaction injection molding (RIM), injection molding, low pressure injection molding, casting or rotomolding, the mold closes to form a mold cavity 355 into which materials are provided. The formable material may include thermoplastics, thermosets, or combinations thereof classified by grades appropriate to each shaping method. Sufficient pressure is applied to the formable material to form the material over the encapsulation zone 345 and bond the material to the encapsulation land 343 of the light-transmitting pane 333. The mold is then cooled to a temperature allowing the formable material to solidify. The mold is opened and the fenestration building product is removed from the mold.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A fenestration article enclosing an opening in a vertical wall of a building, the opening being defined by a plurality of intersecting transverse walls, comprising:
    a light-transmitting panel having a first pane and a second pane spaced apart from the first pane and defining a cavity therebetween, each pane having an exterior surface spaced apart and facing away from the cavity, each pane having a periphery; and
    a unjointed, unitary annular frame situated immediately adjacent to and continuously bonded to the exterior surface of at least one pane at an interface adjacent to the periphery, the frame also forming a wall flashing and a sill flashing all the way around the window, the wall flashing being adapted to form a seal with the vertical wall and the wall flashing is situated inboard of a portion of the cavity relative to the building so that the article protrudes from the vertical wall, the sill flashing being adapted to form a seal with the transverse walls, wherein the panel is fixedly disposed relative to the wall flashing and sill flashing when the panel is mounted on the vertical wall preventing moisture from achieving access to the cavity or the building.

2. The article of claim 1, wherein the fenestration article comprises a window.

3. The article of claim 1, wherein the frame comprises a plastic composition.

4. The article of claim 3, wherein the plastic composition comprises a thermoset plastic composition.

5. The article of claim 1, wherein the pane interface includes an activated zone situated at the interface on the exterior surface adjacent to the periphery improving bonding of the frame to the exterior surface of the pane.

6. The article of claim 1, wherein the interface is situated between the wall flashing and sill flashing.

7. The article of claim 1, wherein the frame is directly bonded to both the first and second panes.

8. The article of claim 7, wherein the wall flashing defines a second cavity situated inboard relative to the building of a portion of the window when the frame is situated on the vertical wall so that the frame may receive insulation.

9. A fenestration article enclosing an opening in a vertical wall of a building, the opening being defined by a plurality of intersecting transverse walls, comprising:
    an insulated window having a first pane and a second pane spaced apart from the first pane and defining a first cavity therebetween, each pane having a periphery and having an interface adjacent to the periphery; and
    a frame disposed on the vertical wall comprising a unitary layer of plastic composition supporting and fixedly positioning the window relative to the frame, the frame forming an elongated wall flashing having an end situated inboard of the cavity relative to the building so that the insulated window protrudes from the vertical wall, the flashing being adapted to form a seal with the vertical wall, the frame having a frame portion bonded at the interface about the entire periphery of the insulated window.

10. The article of claim 9, wherein the plastic composition is a thermoset plastic composition.

11. The article of claim 9, wherein the frame also forms an elongated sill flashing disposed at a substantially perpendicular angle relative to the wall flashing.

12. The article of claim 11, wherein the sill flashing is disposed entirely inboard of the insulated window relative to the building.

13. The article of claim 11, wherein the sill flashing is adjacent to more than three transverse walls.

14. A fenestration article enclosing an opening in a vertical wall of a building, the opening being defined by a plurality of intersecting transverse walls, comprising:
    an insulated window forming a planar surface having a periphery and an interface adjacent to the periphery; and
    a unitary frame supporting and fixedly positioning the window relative to the vertical and intersecting walls, the frame contacting the vertical wall and more than three intersecting walls, the frame being annular and defining an aperture, the frame having a frame portion bonded at the interface about the entire periphery of the insulated window, the frame forming an elongated sill flashing having an end situated inboard of the insulated window relative to the building so that the insulated window protrudes from the vertical wall, the sill flashing being adapted to form a seal with more than three transverse walls.

15. The article of claim 14, wherein the frame forms a wall flashing radiating from the insulated window parallel to the planar surface of the insulated window so that the unitary frame seals the opening all around the vertical wall and the transverse walls.

16. The article of claim 14, wherein the frame has a greater average wall thickness about the insulated window than an average wall thickness adjacent to the end of the sill flashing.

17. The article of claim 14, wherein the frame forms a wall flashing disposed adjacent to the vertical wall, the wall flashing forming an insulating cavity disposed outboard of the transverse walls and proximate to the insulated window so that additional insulation may be situated near to the opening and window.

18. The article of claim 14, wherein the frame includes a channel that continuously and directly encapsulates the insulated window at the interface.

19. The article of claim 18, wherein the channel has an average wall thickness exceeding an average wall thickness of the frame adjacent to either the vertical wall or the intersecting walls.

* * * * *